United States Patent [19]
Newsom

[11] Patent Number: 5,380,431
[45] Date of Patent: Jan. 10, 1995

[54] OIL RECOVERY SYSTEM

[76] Inventor: Cosby M. Newsom, 15517 S. Seaforth, Norwalk, Calif. 90650

[21] Appl. No.: 191,427

[22] Filed: Feb. 3, 1994

[51] Int. Cl.$^6$ .............................................. L02G 15/04
[52] U.S. Cl. ............................ 210/242.3; 210/242.4; 210/223; 210/924
[58] Field of Search ................... 210/242.3, 242.4, 776, 210/923, 924, 540, 538

[56] References Cited

U.S. PATENT DOCUMENTS

| | | | |
|---|---|---|---|
| 3,576,257 | 4/1971 | Yates | 210/923 |
| 3,608,727 | 9/1971 | Grutsch | 210/242.4 |
| 4,165,282 | 8/1979 | Bennett et al. | 210/924 |
| 4,978,448 | 12/1990 | Terokomos | 210/923 |

FOREIGN PATENT DOCUMENTS 716567  2/1980  U.S.S.R. .

Primary Examiner—Christopher Upton

[57] ABSTRACT

An apparatus for recovering oil spilled upon a body of water. Oil accumulators (10) having numerous open-ended cells (20) entrain spilled oil upon the surfaces (24, 26, 32) of the cells (20) when partially submerged in an area where oil has been spilled upon water. The oil accumulators (10) are rotated so as to lift the oil entrained upon the cell surfaces (24, 26, 32) from the water. An oil remover (12) may have superheated steam nozzles (64) located immediately above the oil accumulator (10). When oil-bearing cells pass beneath the nozzles (64), superheated steam may warm and expel the oil from the cells (20). An oil collector (14) collects the oil removed by the oil remover (12) where gravity flow transports the oil to a storage reservoir.

19 Claims, 9 Drawing Sheets

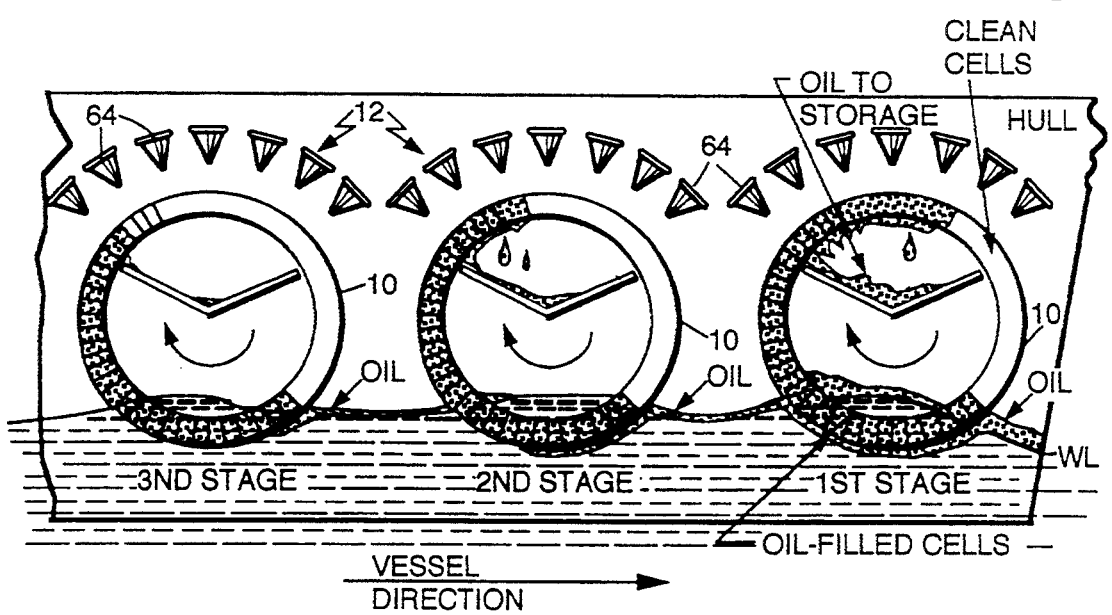
Fig. 1.
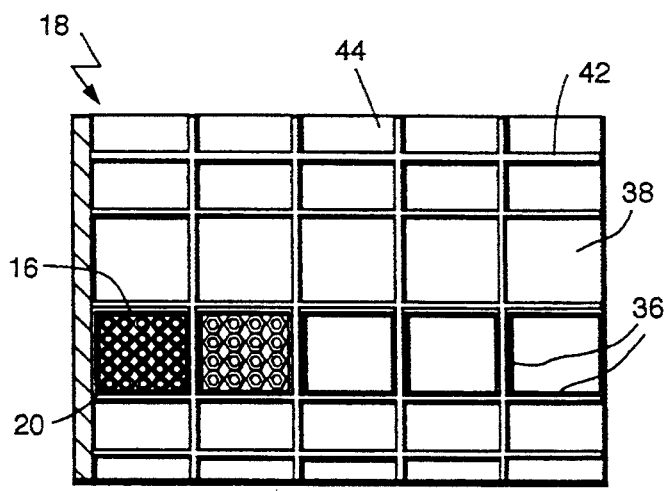
Fig. 2.
Fig. 7
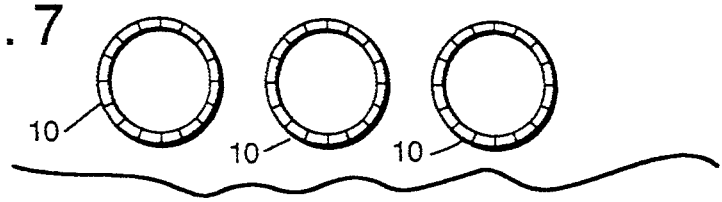

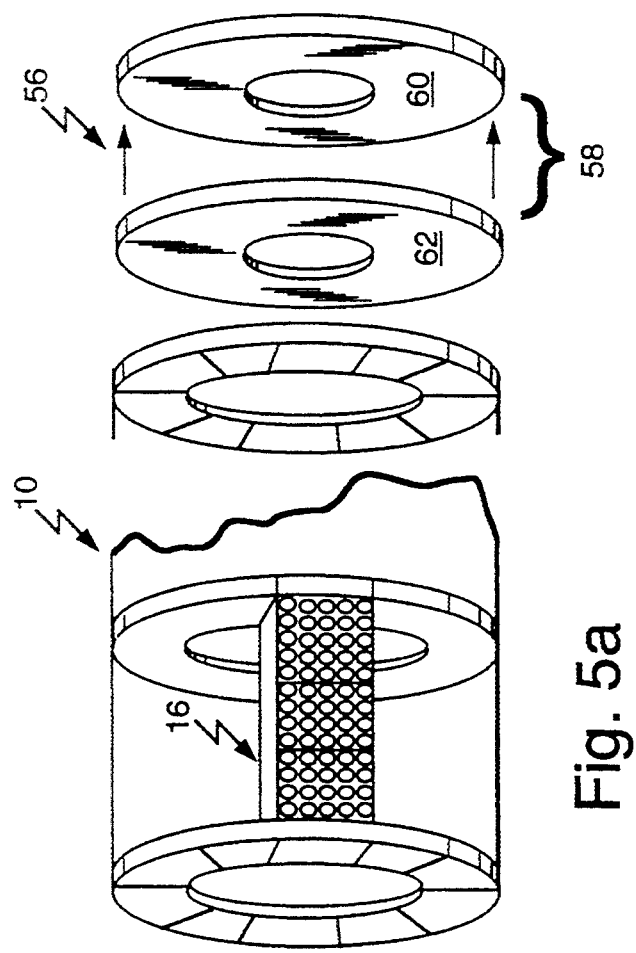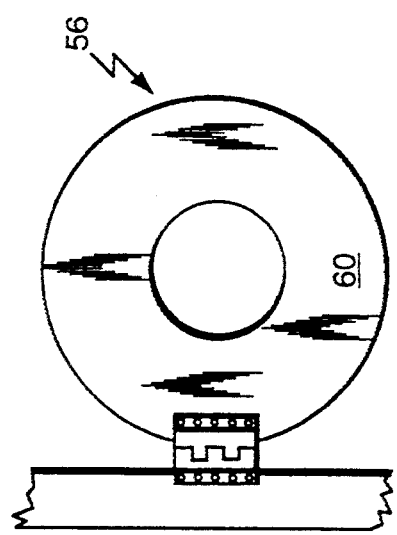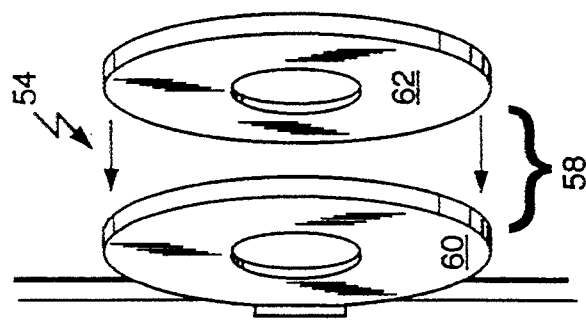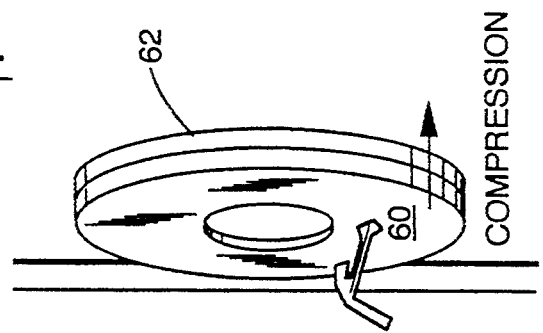
Fig. 5a

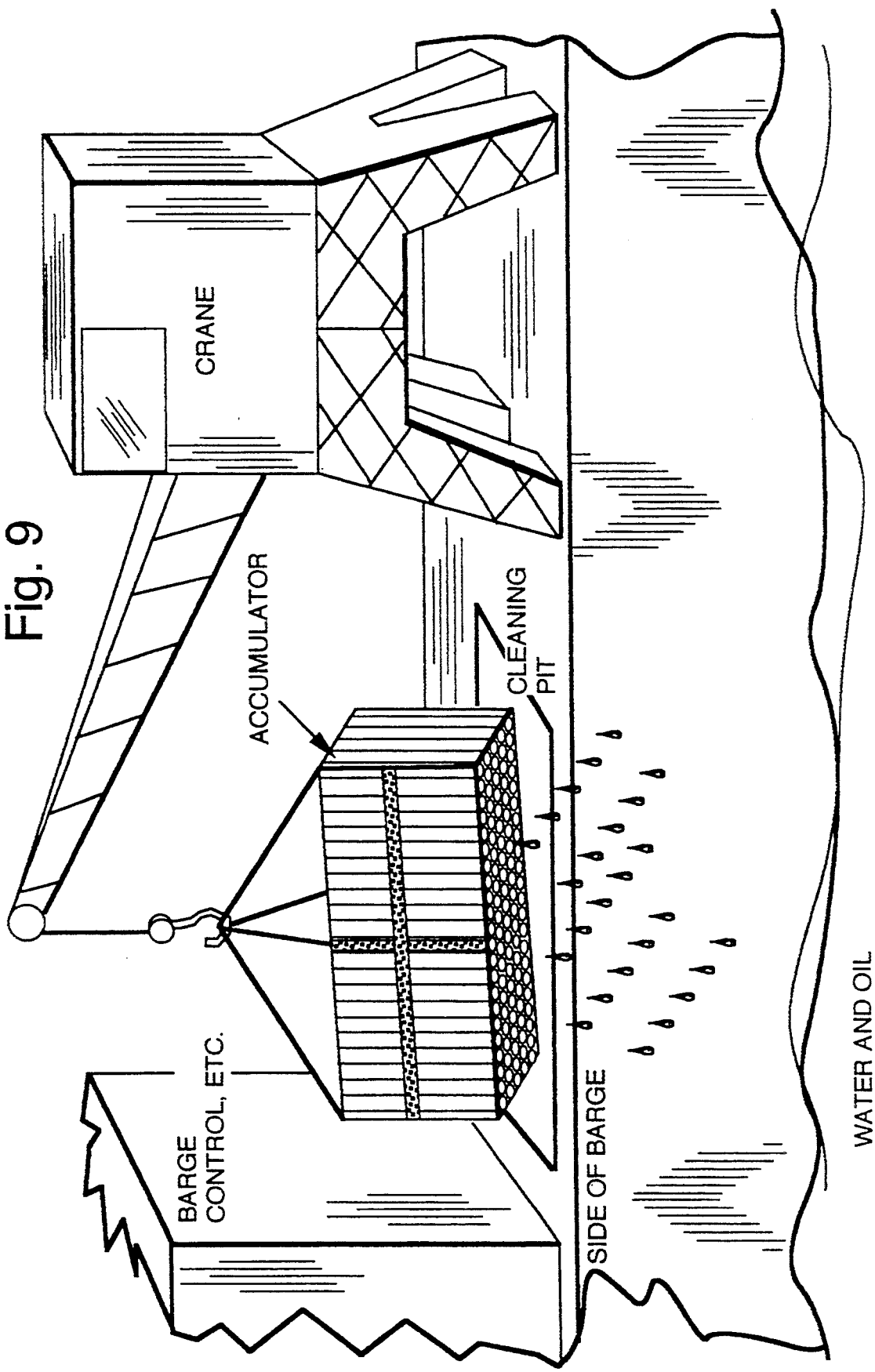

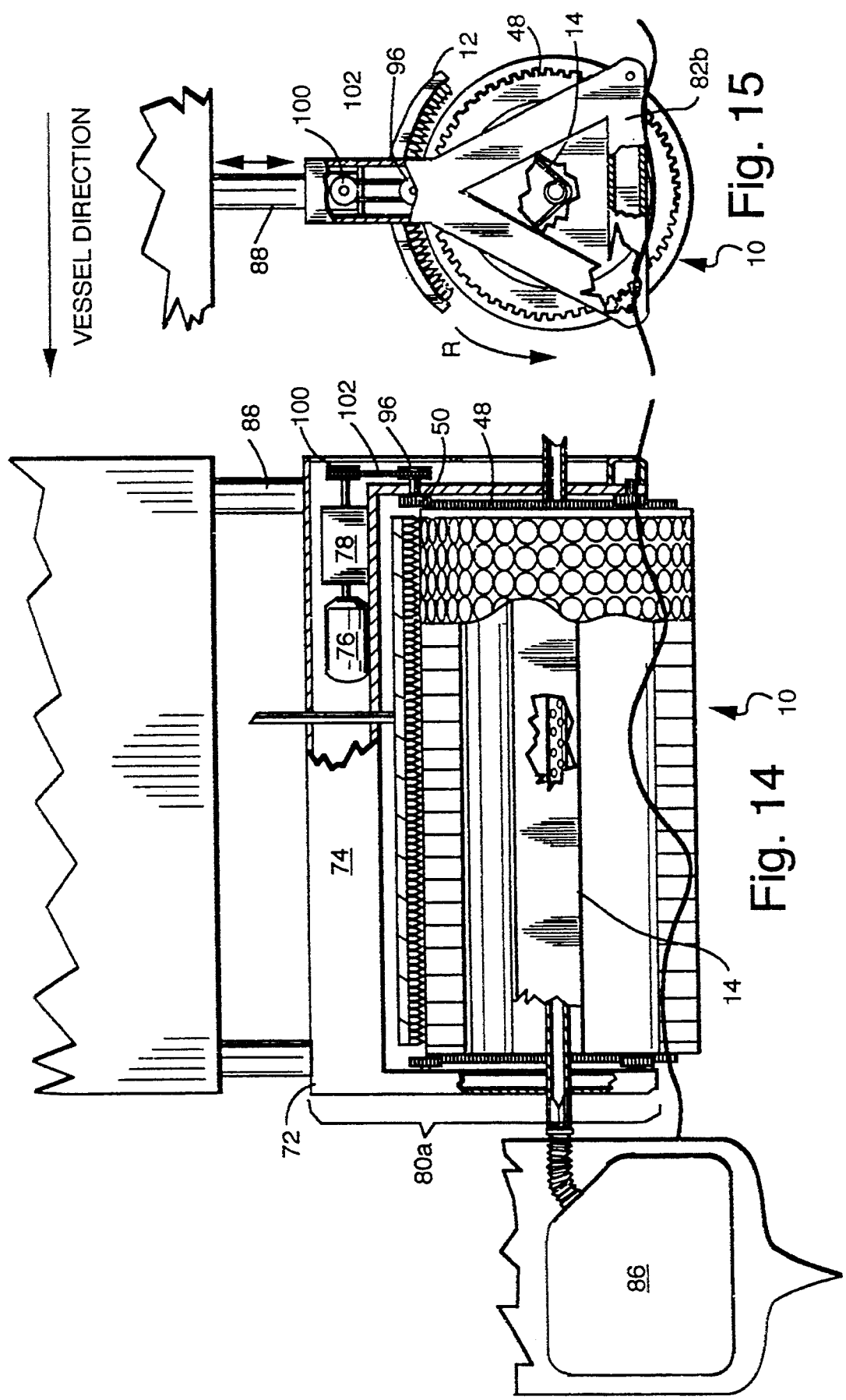

OIL RECOVERY SYSTEM

TECHNICAL FIELD

The invention set forth herein relates to spilled-oil recovery devices. More particularly, this invention relates to devices capable of recovering oil that has been spilled on water that collect the oil in preference to the water.

BACKGROUND ART

With the increased use of oil in modern industrial processes and manufactures, accidental oil spills have become more common. Frequently, such spills occur during the transport and shipping of oil when it is transferred from one container to another or when an oil container is ruptured for one reason or another.

Oil tankers with oil-holding capacities of many thousands of barrels navigate the world's oceans to ship oil from oil-bearing regions to oil-consuming regions. Foul weather and navigational errors can sometimes cause these tankers to run aground and rupture, forcing them to spill some or all of their contents. Offshore oil rigs sometimes suffer damage or blowouts that can cause oil to spill upon the ocean's surface. Other circumstances may occur where oil is spilled in significant or large quantities upon oceans, lakes, rivers, or streams.

When oil is spilled, it presents significant ecological problems to the environment in which it is spilled. Crude oil is toxic and adversely affects the life processes of most creatures and plants. Crude oil also contains several fractions, some of which are volatile and evaporate soon after exposure to the air. Others of these fractions are less volatile and form dense, thick globules or mats that may linger for several months, even years.

Due to the toxic nature of spilled oil, and due to the ecological consequences of such spilled oil, significant interest has arisen over the past several years in search of methods to recover such spilled oil. Such interest is reflected in the following patents:

| Patent Number | Inventor | Date Issued |
| --- | --- | --- |
| 5,169,519 | Elsas | 08 Dec. 92 |
| 5,137,630 | Eklund | 11 Aug. 92 |
| 5,089,121 | McWhinnie | 18 Feb. 92 |
| 5,051,181 | Sandkvist | 24 Sep. 91 |
| 5,043,064 | Abell et al. | 27 Aug. 91 |
| 5,028,325 | Hamilton | 02 Jul. 91 |
| 4,834,880 | Lundin | 30 May 89 |
| 4,485,013 | Cockman | 27 Nov. 84 |
| 4,360,430 | Ellis | 23 Nov. 82 |
| 4,336,137 | Byers | 22 Jun. 82 |
| 4,316,806 | Canevari | 23 Feb. 82 |
| 4,105,554 | Janson | 08 Aug. 78 |
| 3,904,528 | Yocum | 09 Sep. 75 |

While these patents reflect some of the interest that has been shown in the development of the spilled-oil recovery art, the means by which they accomplish this task varies significantly. Some use mops or the like by which the oil is wicked out of the water. Others use conveyors that engage the oil to remove it from the water. Such conveyors often require scraping or the like once the oil has been engaged by the conveyor. Still others use chemical means that may allow for easier engagement or recovery of the spilled oil. However, such chemical means of oil recovery may impart to the water and local environment additional chemical contaminants that may not be welcome and might be toxic.

While the background art indicated above may have some virtues not present in the present invention, generally they rely upon complicated machinery requiring several components subject to easy wear and deterioration. Mops gradually become less effective as their use continues. Conveyors requiring bristles or fingers that are scraped will require replacement after continued use as well. With chemical recovery systems, the chemicals used to recover the spilled oil is naturally dissipated and dispersed over time, requiring replenishment on an ongoing basis.

DISCLOSURE OF INVENTION

The present invention addresses these deficiencies while providing efficient means by which spilled oil can be more conveniently and quickly recovered. Using the adhesive affinity oil has for oleophilic surfaces, the present invention allows the physical separation of spilled oil from water. Upon separation, the oil is then collected for storage and is available for transport, refining, or other related uses.

In the present invention, an oil accumulator is provided that serves to engage the floating oil. Generally, the oil accumulator has a honeycomb structure provided by a plurality of open cells or tubes. The surfaces of the open cells are oleophilic and collect the oil by adhesion. Oil adheres to the surfaces of the cells while water does not. When the cells are lifted from the water, oil entrained upon the cell surfaces is selectively separated from the water.

If the oil entrained upon the cell surfaces was left upon them, the capacity of the oil accumulator would be minimal and saturation of the oil accumulator would quickly occur. To enhance the operation of the oil accumulator so that it can continuously collect and separate oil from water, the oil entrained by the cells is removed from the oil accumulator by an oil remover operatively associated with the oil accumulator.

Generally, the oil remover frees or expels the oil entrained upon the oleophilic surfaces of the oil accumulator cells. The cells are then free to collect more floating oil, which is then removed by the oil remover. As currently contemplated, such oil removing means includes the use of steam that, when applied to the oil entrained by the cells, heats the oil so that it flows as by gravity from the oleophilic cell surfaces. Compressed air may also be used to expel the entrained oil. The oil removed by the oil remover is intended to flow from the cells so that it may be collected and stored.

To collect the entrained oil once it has been removed from the cells, an oil collector is cooperatively associated with the oil accumulator. The oil collector prevents the removed oil from flowing back into the water and can advantageously provide means by which such collected oil may be delivered for storage. As such, the oil collector is placed so that the removed oil flowing from the oleophilic cell surfaces naturally flows to the oil collector. While the oleophilic cells of the oil accumulator return to accumulate more oil, the oil deposited in the oil collector may be drained off for storage and possible future use.

BRIEF DESCRIPTION OF DRAWINGS

FIG. 1 shows a side plan view of the present invention in a series of oil accumulators in use to collect spilled oil, steam nozzles forcing oil collected by the cells into a collection trough.

FIG. 2 shows a front plan view of the oil accumulator of the present invention. Removable blocks of tubing are shown supported in a hollow cylinder.

FIG. 5a shows a schematic and diagrammatic representation of a support mechanism for use with driving the accumulator 10.

FIG. 7 shows a series of oil accumulators lifted from the water so that no oil is accumulated.

FIG. 9 shows a rectangular bank of cells that may be dipped into an oil slick to remove the oil there.

FIG. 14 shows a front elevational view of the oil accumulator and accumulator support with the oil collecting attachment to an oil reservoir. A cutaway view is shown of the interior of the oil accumulator with its oil collector.

FIG. 15 shows a side elevational view of the oil accumulator and support as also shown in FIGS. 13 and 14.

MODES FOR CARRYING OUT THE INVENTION

The present invention may be used under a variety of circumstances to collect and remove oil that has been spilled upon a body of water. The body of water may be an ocean, lake, or river, yet within the current contemplation of the present invention, such spilled oil may be usefully, efficiently, and cleanly removed.

Figure 12:
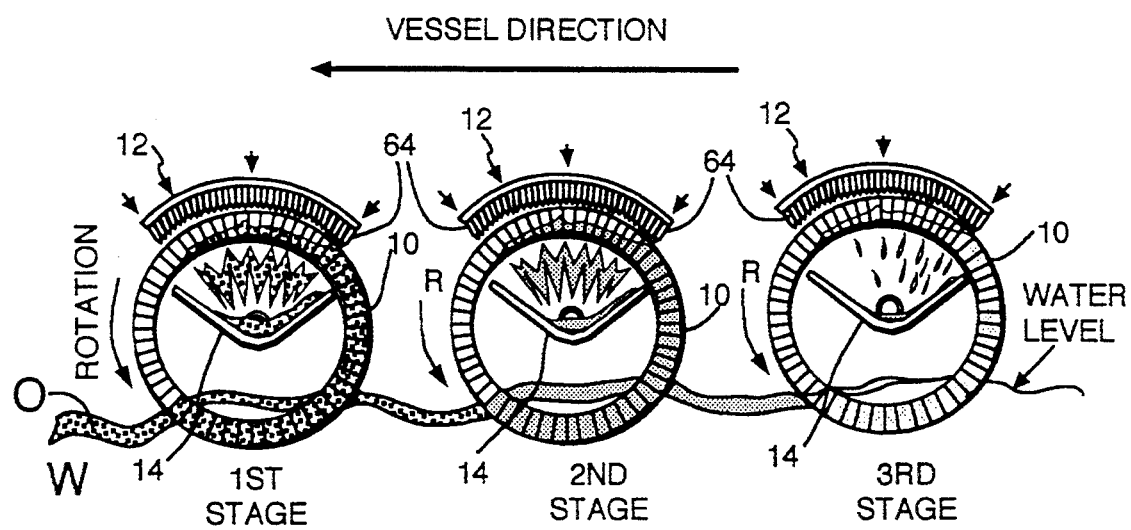
FIG. 12 shows a side elevational view of three oil accumulators in operation, similar to that shown in FIG. 1.

As shown generally in FIGS. 1 and 12, the present invention uses an oil accumulator 10 to gather and separate oil O from the surface of the water W. The oil accumulator 10 entrains oil upon oleophilic surfaces present within the oil accumulator 10. After oil has been entrained by the oil accumulator 10, an oil remover 12 removes the entrained oil from the oil accumulator 10. Before the removed oil can return to the water, an oil collector 14 catches the removed oil and transports it away from the collecting site for storage or other appropriate disposal. An ongoing oil recovery system is established by the present invention as once the entrained oil has been removed from the oil accumulator 10, the oleophilic surfaces may return to gather and separate more oil O from the water W.

As shown in FIG. 2, the present invention uses a series of removable blocks 16 about the circumference of a hollow cylinder 18. The hollow cylinder 18 acts as a cage to support the removable blocks 16. The removable blocks 16 are completely filled with hollow cells 20 that provide the removable blocks 16 with lightweight means by which oil may be removed from the water.

Figure 3:
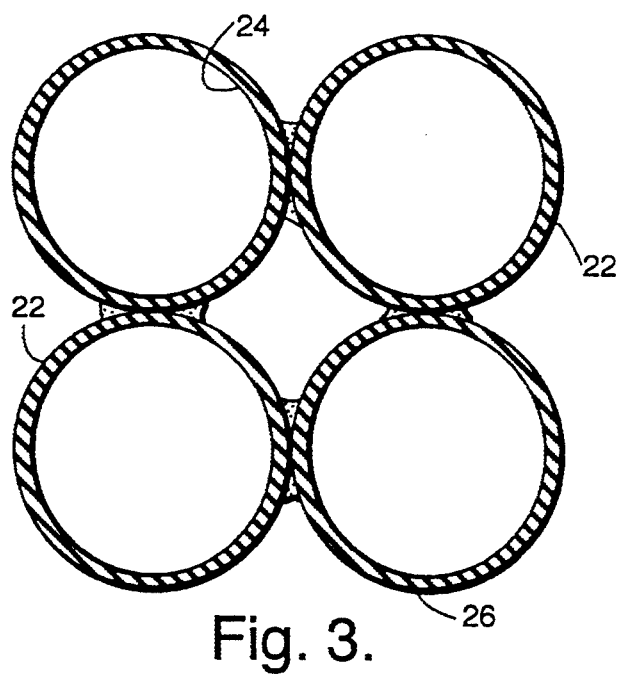
FIG. 3 shows a plan view of individual tubes connected in a manner used to construct a removable block of tubing.
Figure 4:
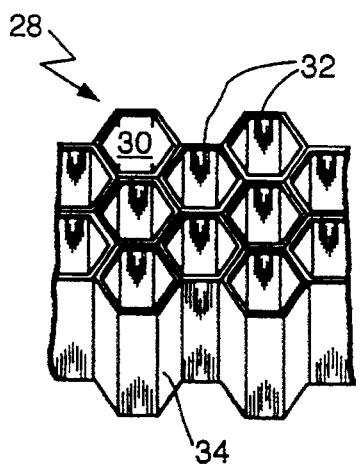
FIG. 4 shows a perspective view of a honeycomb structure that may be used to construct a removable block of tubing.

FIGS. 3 and 4 show two alternative methods by which the hollow cells 20 may be constructed. In the embodiment shown in FIG. 3, cylindrical tubes 22 may be welded, brazed, or bonded together for structural integrity and strength. Such tubes 22 are preferably bonded together equally along their lengths so that the open ends of the tubes 22 are even with one another. Furthermore, and as shown in FIG. 3, the tubes 22 may be connected to one another to maximize the available surface area. When so maximized, the available surface area provided by the tubes 22 includes not only the interior surface area 24, but also as much external surface area 26 as can be provided. By maximizing the available surface area of the tubes 22, more oil can be collected by the accumulator 10.

By attaching or connecting the cylindrical tubes 22 to one another, handling of such attached tubes 16 may also be easier. Such cylindrical tubes 22 may have thin walls so that more tubes 22 may be carried by a removable block 16. When cylindrical tubes 22 are bonded together, a rigid structure is provided that may not only entrain oil upon its exposed surfaces, but may also provide structural support and rigidity for the oil accumulator 10.

Alternatively, a honeycomb structure 28 may be substituted for the cylindrical tubes of FIG. 3. As shown in FIG. 4, a honeycomb structure 28 having a number of individual cells 30 can provide surfaces 32 upon which oil may be entrained. Unlike the cylindrical tubes 22, no interior or exterior surface difference is established by the honeycomb structure 28. Generally, each surface 32 of the honeycomb structure 28 can be considered as an interior cell surface, save the surfaces 34 about the perimeter of the honeycomb structure 28.

As contemplated, the honeycomb structure 28 may be marine grade aluminum or stainless steel with a honeycomb core cell width dimension range of one-eighth inch ($\frac{1}{8}$", 0.31 cm) to one inch (1", 2.54 cm). The size of the cell 30 (or cylindrical tube 22) is selected according to the oil to be recovered. A larger tube width is used for thicker oil while a smaller tube width is used for thinner oil. The marine grade aluminum honeycomb core can be commercially obtained in a volume that is approximately three feet (3', 91.44 cm) deep by four feet (4', 121.92 cm) wide by eight feet long (8', 243.84 cm). Typical weight densities for honeycomb core range from ten pounds per cubic foot (36.37 kilograms per cubic meter) to two pounds per cubic foot (7.27 kilograms per cubic meter). Similar materials may be available for the cylindrical tubes 22.

The removable blocks 16 fit within the hollow cylinder 18 in a manner allowing for the easy replacement of one removable block by another. One means by which such replacement may be accomplished is by providing a framework 36 within the hollow cylinder 18. The removable blocks 16 are most easily accessible from the exterior of the hollow cylinder 18 and so are most easily replaced from there. The framework 36 defines a number of cages 38 in which the removable blocks 16 are held. The cages 38 are defined by radial trusses 40 that define and encircle the hollow cylinder 18 and transverse supports 42 that run lengthwise along the exterior of the hollow cylinder 18.

The radial trusses 40 are engaged in a spaced apart relation that allows room and preferably maximum exposure for the removable blocks 16. The radial trusses 40 provide support for the removable blocks 16 and so must be sturdy to ensure that the removable blocks 16 are securely held. The same is similarly true for the transverse supports 42.

The ends of the hollow cylinder 18 may serve to secure it as a whole. As the radial trusses 40 and the transverse supports 42 may span the depth of the cells 20 or tubes 22, an inner ring or rings 44 may secure the radially inner portions of the trusses 40 and supports 42. Similarly, an outer ring or rings 46 may be used to secure the radially outer portions of the trusses 40 and supports 42. When the trusses 40 and supports 42 are attached or connected to one another, and when the ends of the hollow cylinder 18 are secured, the removable blocks 16 are supported by the stable structure of the hollow cylinder 18 in which they may reside when the oil accumulator 10 is used.

Various means may be used in order to allow the easy insertion and removal of the removable blocks within the cages 38. Flanges (not shown) may be used to entrap the removable blocks 16 within the cages 38. Such flanges may be hingeably attached to the radial trusses 40, the transverse supports 42, or both. The flanges would preferably lock down closely to the framework 36 to minimize any interference by the flanges with the surrounding area. Such interference could detract from and prevent optimum operation by the oil accumulator 10.

Installation of a removable block 16 would begin with the release of the flange locks and the opening of the flanges. Should a second removable block already occupy the space for the first removable block 16, that second removable block would be removed from the cage 38 by pulling it free of the cage 38. The first removable block would then be inserted into the cage 38. Stops at the back of the cage 38 can be used to prevent the continued travel of the removable block 16 through the cage 38. Such stops may also work in cooperative manner with the lockable flanges in order to secure the removable block 16 within the cage 38. The stops and flanges may slightly compress the removable block 16 between them so that the removable block 16 is firmly and snugly held by the hollow cylinder 18.

Alternative means may also be used to secure the removable blocks 16 within the cages 38. The removable blocks 16 may be directly secured in a detachable manner to the framework 38. Slots, grooves, or other apertures may be provided in either the removable block 16 or the framework 38. Conversely, lockable pins or other sliding or moving structures may be present in either the framework 38 or the removable block 16. In a cooperating manner, an aperture of one structure would correspond to a pin in the other, with the pins fitting into the apertures. In this way, the removable block 16 could be secured to the framework 38 when in use, yet readily retrievable and removable.

The oil accumulator 10 is constructed in a cylindrical fashion so that it may be turned along its major axis. In order to drive the oil accumulator 10 in such a manner, the outer ring 46 may have attached to it a ring gear 48.

The ring gear 48 allows the oil accumulator 10 to be driven as by a motor. See FIGS. 13-15. The driving gear 50 may have a diameter much smaller than the ring gear 48 to reduce the angular speed of the oil accumulator 10 and to provide mechanical advantage for the driving gear 50 over the ring gear 48 and the oil accumulator 10. By varying the rotation speed of the driving gear 50, the rotation speed of the oil accumulator 10 may be controlled.

Figure 11:
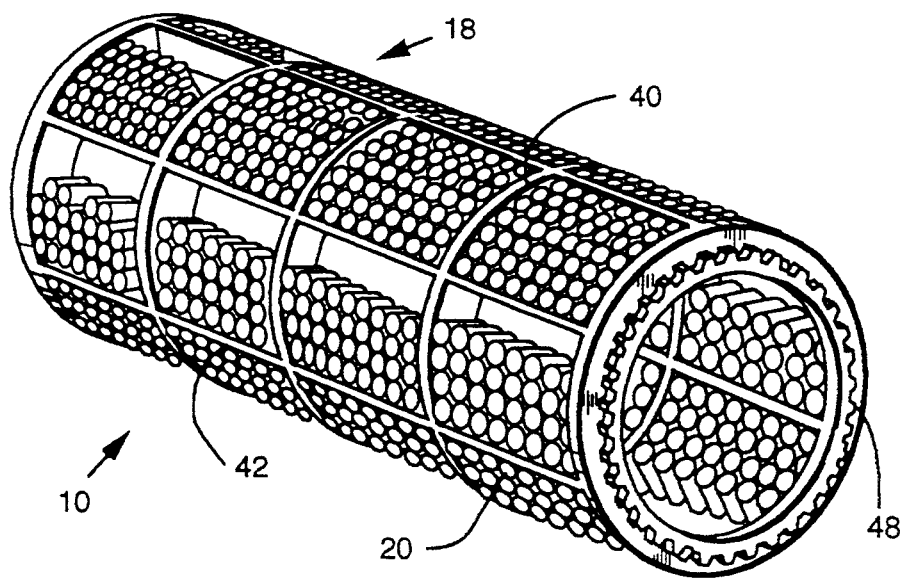
FIG. 11 shows in perspective an oil accumulator of the present invention, showing some internal structure thereof with the oil collector and oil remover absent.

FIG. 11 also shows the oil accumulator 10 in perspective. The oil accumulator has a ring gear 48 at its far end and defines the hollow cylinder 18 by its radial trusses 40 and the transverse supports 42. There are a multitude of honeycomb core or tubing cells in removable cartridges, fitting between the trusses 40 and the supports 42. Oil accumulator 10 in FIG. 11 is shown without oil collector 14 and oil remover 12.

In order to efficiently collect oil that has been spilled, the oil collector 10 is turned about its major axis at the surface of the water where the spilled oil is located. In one embodiment of the present invention, such as that shown in FIG. 10, a catamaran may be used. When used in conjunction with such a catamaran, the oil accumulator 10 is placed between the two hulls. As the catamaran travels through the water, the oil accumulator 10 is turned by the driving gear 50.

Figure 5:
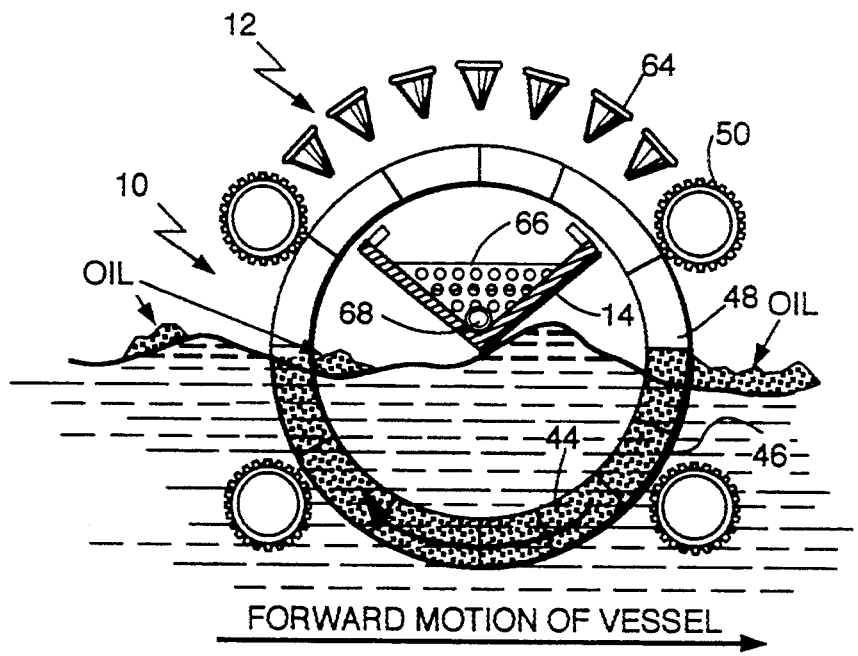
FIG. 5 shows a side plan view of a cylindrical oil accumulator using removable blocks of tubing as shown in FIGS. 2-4. Also shown are steam nozzles, the collection trough, mounting and driving gears.
Figure 8:
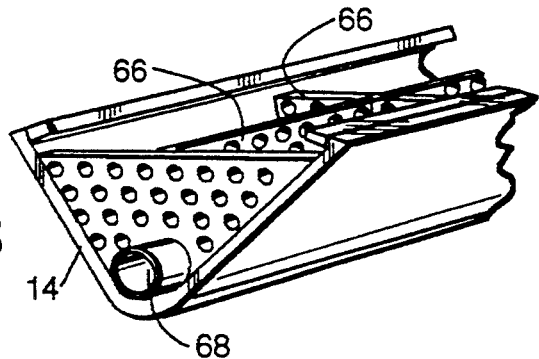
FIG. 8 shows a perspective view of a preferred oil collector of the present invention having perforated baffles.

It is more advantageous to provide means by which oil accumulators 10 may be removably fitted to such a catamaran, yet also be freely turnable so that a minimum of resistance may be encountered by the driving gear 50. As is explained in greater detail below, an oil collector 14 centrally rests within the hollow core of the oil accumulator 10. The presence of the oil collector 14 prevents the use of central axle by which the oil accumulator 10 may be supported and upon which the oil accumulator 10 may be turned. In contemplated embodiments of the present invention, the oil accumulator 10 may be held between the catamaran hulls by compression, as by a releasable clamp (such as that shown in FIGS. 5a), or by a supporting structure (such as that shown in FIGS. 13-15). For the releasable clamp embodiment, bearing surfaces at the opposed ends of the clamp allow the oil accumulator 10 to turn.

Figure 6:
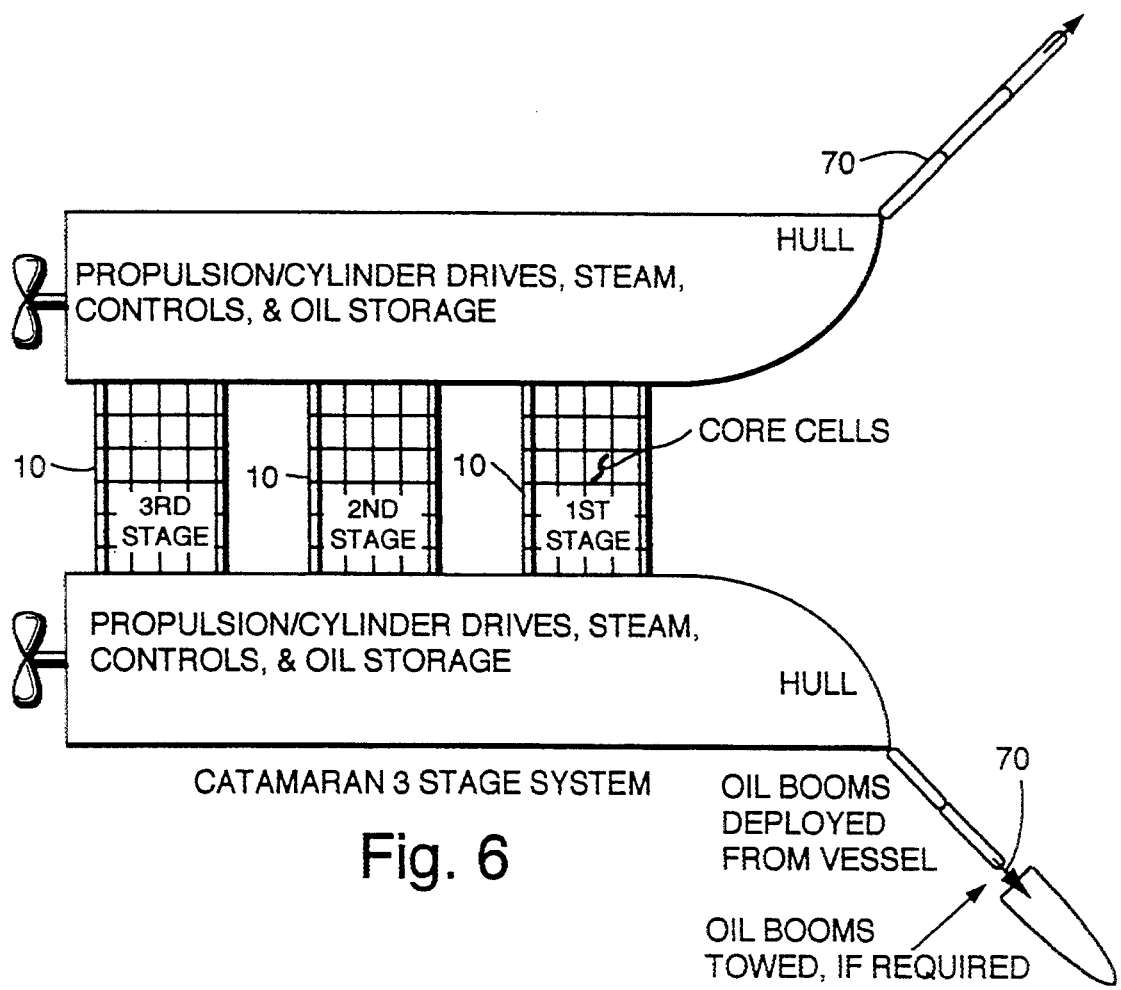
FIG. 6 shows a top plan view of a catamaran oil collection vessel using a series of oil accumulators as shown in FIG. 1.

As shown in FIG. 6, series of oil accumulators 10 may be positioned in tandem so that oil and water flowing under them may be subject to oil accumulation several times. Each of these oil accumulators 10 is removably attached to the catamaran between the hulls. In order to so make the oil accumulators removably attachable, the inner sides of the hulls may be fitted with movable clamp or vise structures that not only allow the oil accumulators to be removably attached to the catamaran, but also allow the oil accumulators 10 to be raised and lowered in the water.

Referring to FIG. 5a, the accumulator vises 52 have two corresponding parts: a fixed jaw 54 and a movable jaw 56. The fixed jaw 54 of an accumulator vise 52 may be fixed to its support while the movable jaw 56 may swing away from the support to which the movable jaw 56 may be hingeably attached. When the movable jaw 56 swings away from the fixed jaw 54, a greater amount of space is provided between the two jaws. This space between the two jaws is ample enough for an oil accumulator 10 to be placed between the two jaws. However, when the movable jaw 56 is swung back into position, the space between the two jaws is just slightly smaller than the width of the oil accumulator 10. In this way, the oil accumulator 10 may be snugly engaged and securely held between the two jaws.

Fixed to the two jaws 54, 56 between the oil accumulator 10 and each of the respective jaw 54, 56, are circular bearings 58 having a fixed base plate 60 and a freely turning circular plate 62. The circular plates 62 are free to turn as they ride upon ball bearings or other suitable means. The ball bearings are kept in place as they are sandwiched between the circular bearing plates 62 and the base plates 60. The base plates 60 are secured to their respective jaws 54, 56. The circular bearing plates 62 correspond closely, if not exactly, to the circular end portions of the oil accumulator 10. Gaskets may be used between the oil accumulator 10 and the circular bearing plates 62 to ensure a snug and secure frictional attachment between the oil accumulator 10 and the circular bearing plates 62.

When the movable jaw 56 is swung to one side, the oil accumulator 10 may be positioned (as by a crane or other piece of heavy lifting equipment) so that one end is adjacent to the fixed jaw 54. With the major axis of the oil accumulator 10 perpendicular to the fixed jaw 54 and its corresponding catamaran hull, the movable jaw 56 is swung back to engage the other end of the oil accumulator 10. The major axis of the oil accumulator 10 is positioned between the two circular bearings 58 and is preferably exactly coincident with the centers upon which the two circular bearings 58 turn. Once so positioned, the oil accumulator 10 is fixed between the fixed jaw 54 and the moving jaw 56 of the accumulator vise 52 when the movable jaw 56 is moved back into positioned and locked into place. The oil accumulator 10 is then free to turn upon the circular bearings 58. Upon its fixation between the two jaws 54, 56, the oil accumulator 10 may be coupled to a driving motor by the driving gear 50 so that the rate of rotation of the oil accumulator 10 may be automatically controlled.

The supports to which the jaws of the accumulator vise 52 are fixed may be vertically operable so that the oil accumulator 10 may be moved up or down with respect to the surface of the water below the catamaran, and with respect to the hulls of the catamaran. Hydraulic cylinders with piston arms may be used to raise and lower the vises 52 with their oil accumulators 10. If hydraulic cylinders are so used, the movement of corresponding piston arms should be coordinated so that the centers of turning always correspond to the major axis of the oil accumulator 10. However, if the circular bearings 58 are allowed to swivel or pivot upon their jaws, such correspondence may not be necessary and a degree of attitudinal freedom may be provided for the oil accumulator 10 so that it may address the water's surface with its major axis at an angle to the water. Hydraulic or other adjustable support structures may also provide additional degrees of freedom for the oil accumulator 10, providing a wide range of adjustable positions at which the oil accumulator 10 may address the surface of the water.

In an alternative embodiment to the circular bearing 58 and the accumulator vise 52, sets of mounting wheels may be used to support and secure the oil accumulator 10 that may also be used to drive the oil accumulator 10. Such sets of mounting wheels may be present on opposite interior sides of the catamaran hulls or from a support structure located above the accumulator 10. The opposite ends of the oil accumulator 10 would then be rotatably held in place by such mounting wheels located at each side. To allow removal of the oil accumulator 10, a pair of mounting wheels oppositely opposed on opposite catamaran hulls may swing out. The oil accumulator 10 may then be removed from between the catamaran hulls, possibly replaced by another oil accumulator.

Figure 13:
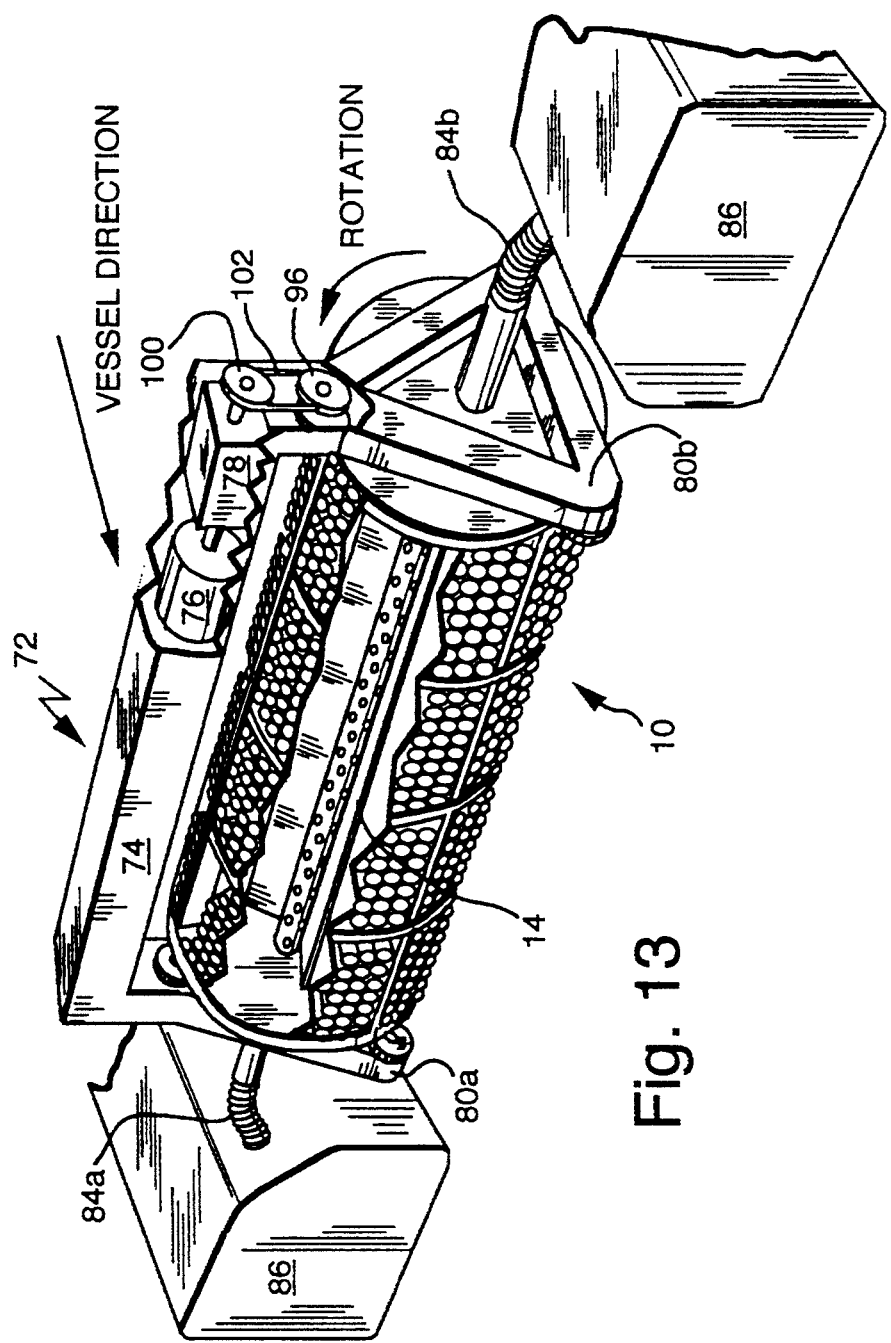
FIG. 13 shows an embodiment of a supporting structure for the oil accumulator of the present invention. The oil accumulator is shown in phantom.

Such mounting wheels may allow the oil accumulator 10 to be supported from above. FIG. 13 is a side perspective view of an oil accumulator support structure, the oil accumulator 10 being shown in phantom. As seen in FIG. 13, the oil accumulator 10 may be supported by an overhead support structure 72. The overhead support structure 72 has an overhead transverse portion 74 spanning the length of the oil accumulator 10.

In one embodiment, the overhead transverse portion 74 may provide space within which a motor 76 and an accompanying gearbox 78 may be held. At either end of the overhead transverse portion 74 are two downwardly extending arms 80a and 80b that serve to hold the oil accumulator 10 in place. Each downwardly extending arm 80a and 80b has a triangular portion at its furthermost end that is generally equidistant vertices at the perimeter of the ends of the hollow cylinder 18 of the oil accumulator 10. Passing centrally or generally centrally through the aperture defined by the triangular portions 82a,b are the connecting hoses 84a,b which connect the central pipe 68 for the oil collector 14 to the oil storage reservoirs 86.

Figure 10:
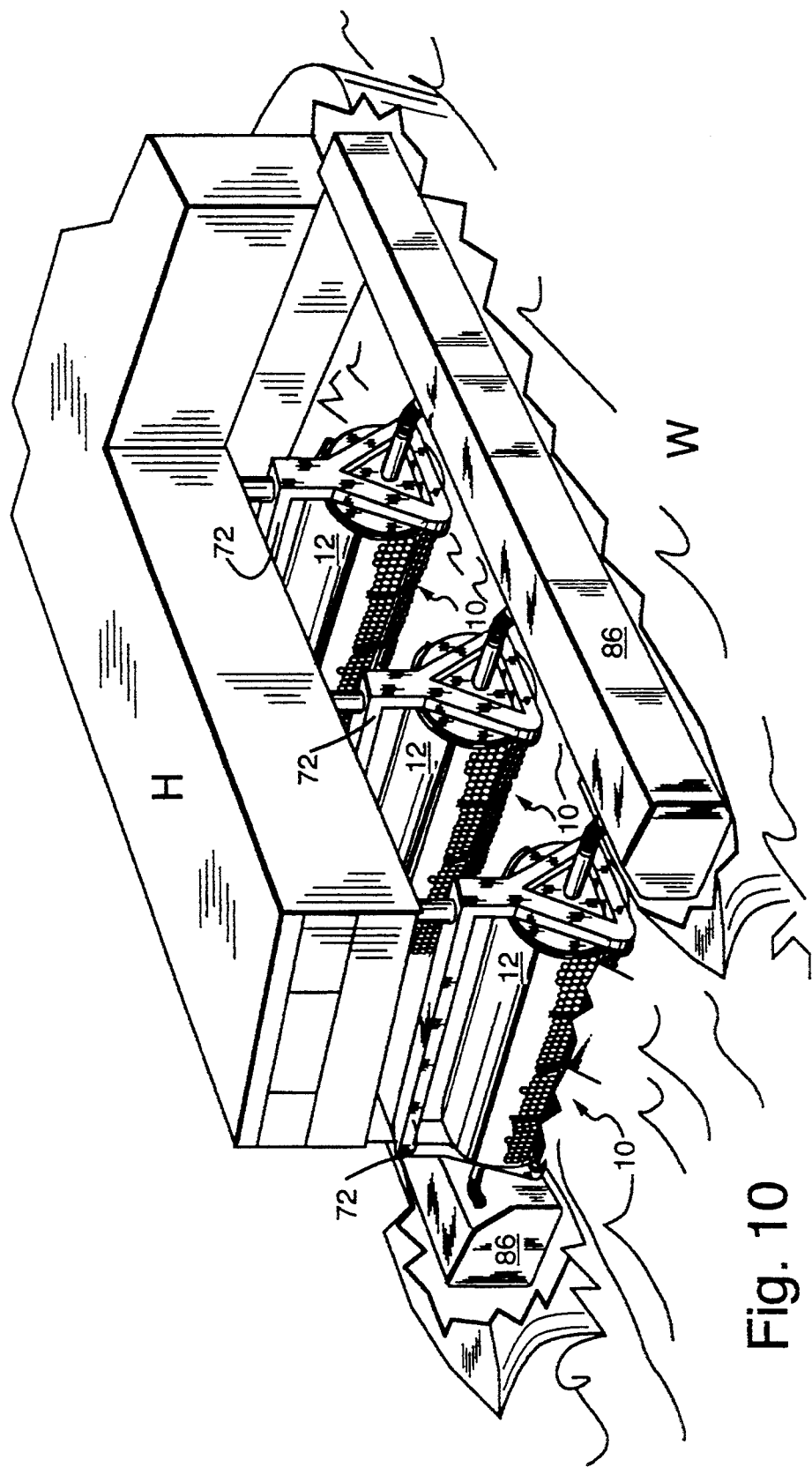
FIG. 10 shows a perspective view of a catamaran vessel of the present invention collecting oil without oil booms.

The overhead transverse portions 74 of the overhead support structure 72 may be supported from above as seen in FIG. 10. Hydraulic or other control mechanisms inside the overhead housing H may allow the oil accumulator 10 to raise and lower as is preferred during the time of operation. Also, it may be advantageous for the pilot house of the vessel to be in the same structure as the housing H. As shown in FIG. 14, a level adjustor 88 may be attached to the overhead transverse portion 74 to control the height of the oil accumulator 10.

The angular portions 82a,b of the downwardly extending arms 80a,b have gears or wheels at their vertices. Gears are used to engage the ring gear 48 of the oil accumulator 10. Such gears include the driving gear 50. It is seen that only one driving gear 50 is needed as long as friction is no great hindrance to the turning operation of the oil accumulator 10. As only one driving gear 50 is needed, the side of the oil accumulator 10 opposite the ring gear 48 needs only to have a flange 90 enabling that side of the oil accumulator 10 to be supported by support wheels 92a, 92b, and 92c located at the vertices of the angular portion 82a. Flange 90 sits between and is entrapped by the support wheels 92a,b,c so that the end of the oil accumulator 10 is supported while in use and is able to freely turn. Similarly, for the opposite end of the oil accumulator 10, the ring gear 48 is held between and entrapped by three gears, two of which 94a and 94b, provide support for the ring gear 48 and that side of the oil accumulator 10. As with the support wheels 92a,b,c, the support gears 94a,b are able to freely turn thereby allowing the oil accumulator 10 to freely turn as well. The driving gear 50 serves as the third support gear to entrap the ring gear 48 between the driving gear 50 and the two support gears 94a,b.

At the top of the triangle 82b is the driving gear 50 which controls the turning of the oil accumulator 10. As shown in FIGS. 13, 14, and 15, the driving gear 50 is axially attached to a pulley 96 by an axle 98. The axle 98 passes perpendicularly through and is able to freely turn within the downwardly extending arm 80b. By turning the pulley 96, the driving gear 50 also turns and engages the ring gear 48 to drive the oil accumulator 10.

A motor 76 is used to provide power to the pulley 98. The motor 76 is controlled remotely from the pilot house or other area on the vessel. The motor 76 has sufficient power to drive the associated oil accumulator 10. The gear box 78 intermediates the power provided by the motor 76 and a second pulley 100. Axles are used to transmit the power from motor 76 to the gear box 78 and on to the pulley 100. The pulley 100 is parallel and coplanar with the drive gear pulley 96, allowing a belt, chain or other member 102 to transmit the turning of the pulley 100 to the pulley 96. When the driving gear 50 is connected to the motor 76 through the gear box 78, pulleys 96 and 100 and the belt/chain 102, the motor 76 has control over and provides power for the oil accumulator 10.

Preferably, the cell surfaces 24, 26, 32 of the removable blocks 16 are oleophilic so that they will attract oil preferentially to water. Furthermore, more advantage to the present invention is provided when the cell surfaces are hydrophobic, or water-repelling. With oleophilic and hydrophobic cell surfaces, oil is preferentially selected by the cell surfaces while water is preferentially rejected. When the oil accumulator 10 is rotated to engage the surface of the water, any oil floating upon the water will be attracted and will cling to the oleophilic cell surfaces. The water will not cling to the cell surfaces and as the oil accumulator 10 is rotated through the water, oil will be lifted and removed from the water by the oil accumulator 10.

In order to continuously remove oil from the water, it is necessary to remove the oil entrained upon the oleophilic cell surfaces 24, 26, 32 so that oil-free cell surfaces may be continuously rotated through the oil slick. In this way, the amount of oil present upon the water is continuously reduced until all of the recoverable oil is removed.

An oil remover 12 is positioned above the oil accumulator 10. The oil remover 12 may take several forms, including the use of compressed air, but the use of dry or superheated steam forcefully driven over the oil-bearing cells is seen as providing an excellent means by which oil can be removed from the cells. Steam nozzles 64 are positioned and contoured above the rotating oil accumulator 10. Oil-bearing cells 20 are continuously positioned under the nozzles 64 in close proximity to them. High pressure, superheated steam (preferably available from an onboard boiler) is forcefully ejected from the nozzles 64 towards the adjacent oil-bearing cells 20.

The steam is preferably so hot that no condensation occurs as it transfers some of its heat to the oil entrained upon the cells. This prevents water from the steam mixing with the oil entrained upon the cells 20. It is also preferable that the cell surfaces become less oleophilic with increased temperature. As most bodies of water are generally cool, increased oleophilicity with lower temperatures would allow the cells 20 to collect more oil when in the water while decreased oleophilicity with higher temperatures would allow the cells 20 to release more oil when subject to the steam bath.

When the superheated steam is forced over the oil-bearing cells 20, some of the heat present in the steam is transferred to the entrained oil and the cells 20. As the oil warms, it becomes thinner and less viscous. The warmed oil will tend to flow downwards toward the center of the oil accumulator 10. This downward flow is enhanced by the force of the steam. The oil previously entrained upon the oleophilic cells 20 of the oil accumulator 10 flows from the cell surfaces 24, 26, 32 into the hollow center of the oil accumulator 10. The cells 20 are freed from the accumulated oil and are available to entrain more oil upon their surfaces as the oil accumulator 10 rotates through the water.

As the oil accumulated by the cells 20 is removed by the oil remover 12, it would naturally tend to flow back into the water, thwarting the efforts made to remove the oil from the water. In order to collect the oil removed from the cells 20, an oil collector 14 is used to collect the accumulated oil. Preferably, no oil returns to the water once accumulated by the oil accumulator 10. The oil collector 14 takes the oil removed by the oil remover 12 and transports it away from the hollow interior of the oil accumulator 10. An oil storage reservoir 86 such as that shown in FIG. 14 may be used to store and transport the recovered oil.

Preferably, the oil collector 14 is a baffled trough that drains into one or both hulls. The oil collector 14 is sloped so that the warmed oil will flow into a reservoir for storage and easy future recovery. As shown in cross section in FIG. 5, the oil collector 14 may have a series of baffles 66 that prevent oil from sloshing and splashing within the oil collector 14. A central pipe 68 may run the length of the oil collector 14 along its lower and centralmost portion. The central pipe 68 is perforated so that oil may seep in and flow to the nearest reservoir. The central pipe forms a clear channel for the collected oil so that it may flow more easily to its reservoir without disturbance from the oil currently being removed from the cells 20 above.

The oil collector 14 may be coupled to the oil accumulator 10 in a number of ways. Generally, it is convenient if the oil collector 14 remains with the oil accumulator 10. Sliding or wheeled supports or struts can serve to position and secure the oil collector 14 within the confines of the hollow interior of the oil accumulator 10. When the oil accumulator 10 is fixed between the hulls of the catamaran, a bridge or other joining surface may be used to bring the oil flow from the oil collector through an aperture above the waterline of the catamaran hull. The collected oil may then be directed into a reservoir present within the catamaran hull.

Having set forth the construction and operation of the oil accumulator 10, the oil remover 12, and the oil collector 14, description is now made of a water borne vessel with two catamaran hulls implementing the present invention.

When oil has been spilled upon an ocean, lake, river, or stream, the present invention may be used to collect the oil so that damage to that local environment may be minimized and so that the spilled oil may be put to some good use rather than abandoned and wasted.

As shown in FIGS. 6 and 10, a water-going vessel in the style of a catamaran can carry a series of oil accumulators 10 in tandem. When oil accumulators 10 are placed in series, it may be advantageous to decrease the size of the hollow cells 20 in succeeding oil accumulators 10. For example, a larger diameter hollow cell size may be used for the first oil accumulator 10. A medium diameter hollow cells size may be used for the second oil accumulator 10. A smaller diameter hollow cell size may be used for the third oil accumulator 10. When this arrangement of descending cell diameter is implemented, thicker and more viscous oil will be entrained upon the cell surfaces of the first oil accumulator 10.

Somewhat thinner and less viscous oil will be entrained upon the cell surfaces of the second oil accumulator 10. The thinnest and least viscous oil will be entrained upon the cell surfaces of the third oil accumulator 10.

One advantage to using the hollow cells 20 in the oil accumulators 10 is that trash, debris, and other flotsam and jetsam will not interfere with the smooth operation of the oil accumulators 10. The size of the hollow cells 20 are sufficiently small so that driftwood and other floating debris will not become entrained in the hollow cells 20. Instead, as the oil is pushed by the water into the cells 20, the debris will simply be forced under the oil accumulator 10 and passed downstream. Should it be advantageous to collect such debris, a debris collector can be located at the stern of the boat so that the debris may be collected where there is a minimum of oil, if any.

The catamaran provides the propulsion and power for itself and for the oil accumulators 10. Oil booms 68 may precede the catamaran at an outward angle that directs a larger area of the oil slick to the oil accumulators 10 than is present merely between the two catamaran hulls.

The speed of the catamaran through the water, as well as the rate of rotation of the oil accumulators 10 through the water, is varied according to the severity and type of the oil spill. Preferably, no oil passes by the last oil accumulator 10 and only oil-free water is present at the stern of the catamaran. To achieve such oil-free water, the depth to which the oil accumulators 10 are submerged in the water and the speed at which they rotate through the water should be adjusted for maximum oil accumulation. It is contemplated that the accumulation of the spilled oil occurs below the waterline where turbulence and wave action are at a minimum. The optimum depth to which the oil accumulators 10 are submerged below the surface should take this feature of oil accumulation into account.

When the oil accumulator 10 rotates through the water, it initially presses down upon the oil slick and the water below it. As the cells 20 are submerged, the water beneath the oil tends to push it into the cells 20. The oil is then entrained upon the oleophilic cell surfaces 24, 26, 32. The accumulated and entrained oil is then separated from the water as the oil accumulator 10 turns and lifts the oil-bearing cell surfaces above the water. When the oil-laden cells 20 reach the oil remover 12, the oil coating the cell surfaces 24, 25, 32 is heated and driven into the oil collector 14. The oil collector drains the oil it collects into reservoirs located in the catamaran hulls. The catamaran may continuously accumulate and collect oil until its reservoirs are full. At that point, the catamaran may return to shore or a larger floating container vessel to empty its reservoirs. With emptied reservoirs, the catamaran may return to the oil slick to collect more oil.

When the catamaran is completely finished collecting oil, the oil accumulators 10 may be lifted from the water as shown in FIG. 7. If the oil accumulators 10 are forced to rotate when they are lifted from the water, they may be cleaned by the oil removers 12 so that any residual oil may be collected and stored. Such cleaning may also diminish any salt water that may cling to the oil accumulators 10, should they be used in the ocean.

The oil accumulator 10 with the oil remover 12 and the oil collector 14 may be used in a continuous manner in a permanent installation, if desired. Should there be a need to continuously purge outflow or discharge from, for example, an industrial complex, the oil recovery system of the present invention may be advantageously used to continuously scrub the water of oil and other non-polar materials present in the water. Instead of using the catamaran as set forth above, a permanent installation of one or several oil accumulators 10 and related structures can be placed where needed. As oil and other materials are accumulated from the water, reservoirs may temporarily store collected oil for later use and/or disposal.

In an alternative embodiment of the present invention, a rectangular bank of hollow cells may be used to collect spilled oil. As shown in FIG. 9, a bank of hollow cells may be dipped into the water where the oil has spilled. Using the same principles as for the oil accumulator 10, the rectangular bank entrains oil upon the surfaces of its hollow cells. A crane, to which the rectangular bank is attached, can be used to hoist the bank from the oil slick. Oil removing and collecting means can be provided adjacent to the crane so that the oil may be removed from the cell surfaces of the rectangular bank. A barge may be used to support all these related structures. Once freed from the entrained oil, the rectangular bank may be dipped again into the oil slick to recover more oil.

The structure set forth for the oil accumulator 10 may also be advantageously used to cool or aerate water flowing past it. When used to cool water, pontoons or the like may be mounted near the mouth of a cooling water outlet such as those present with industrial plants. The flow of the water itself may be adequate to turn the cylinder. The oleophilic cell surfaces of the hollow cells 20 would be advantageously replaced with hydrophilic cell surfaces so that water would cling to the cell surfaces. As the accumulator 10 turned, water clinging to the hydrophilic cell surfaces would be carried to the top of the rotating cylinder. The water on the cell surfaces would then flow out of the cells through gravity and cascade down. As it flowed down, the water would cool in a manner similar to that in a cooling tower.

Likewise, when used to aerate water flowing past it, the accumulator 10 could expose water entrained upon the cell surfaces to the air. Gas exchange could then take place between the water and the air, allowing the water to release any excess gases and to take on additional oxygen.

While the present invention has been described with regards to particular embodiments, it is recognized that additional variations of the present invention may be devised without departing from the inventive concept.

INDUSTRIAL APPLICABILITY

From the description made above, it can be seen that the present invention may be applied industrially in the recovery of spilled oil. Recovering the spilled oil provides a cleaner environment and the ability to use the recovered oil in appropriate industrial or refining processes.

It is an object of the present invention to provide such industrially-applicable oil recovery means.

It is another object of the present invention to provide continuous oil recovery means.

It is yet another object of the present invention to provide spilled-oil recovery means that may be used in a variety of water environments, including oceans, lakes, rivers, and streams.

What is claimed is:

1. A device for separating oil from water, comprising:

an oil accumulator (10), said oil accumulator (10) having a plurality of open substantially tubular cells (20) the plurality of which define a large surface area for its configuration, each of said cells having an oleophilic surface to which oil clings and water does not, said oil accumulator (10) being adapted for contact with oil and water in order to entrain and separate said oil from said water;

an oil remover means (12), said oil remover means (12) being operatively associated with said oil accumulator (10) when oil accumulated by said oil accumulator is to be removed, said oil remover means (12) removing oil from said oil accumulator (10); and an oil collector (14), said oil collector (14) cooperatively associated with said oil accumulator (10) when oil accumulated by said oil accumulator (10) is to be removed, said oil collector (14) being adapted to collect oil removed from said oil accumulator (10) by said oil remover means (12).

2. The device for separating oil from water as set forth in claim 1, wherein said oil accumulator further comprises:

a hollow cylinder (18), said hollow cylinder (18) having radial trusses (40) attached to transverse supports (42), said radial trusses (40) and said transverse supports (42) defining cages (38); and a plurality of removable blocks (16), said removable blocks (16) comprising said plurality of open cells (20), said removable blocks (16) removably fitting within said cages (38).

3. The device for separating oil from water as set forth in claim 2, wherein said cells (20) comprise cylindrical tubes (22).

4. The device for separating oil from water as set forth in claim 2, wherein said cells (20) comprise a honeycomb structure (28).

5. The device for separating oil from water as set forth in claim 2, wherein said oil collector (14) is centrally located within said hollow cylinder (18), said oil collector (14) collecting oil removed by said oil remover (12) and transporting it away from said oil accumulator (10).

6. The device for separating oil from water as set forth in claim 5, wherein said oil collector (14) has baffles (66) and a central perforated pipe (68), said baffles (66) preventing oil spills from said oil collector (14) and said central perforated pipe (68) conducting oil more efficiently away from said oil accumulator (10).

7. The device for separating oil from water as set forth in claim 1, wherein said oil removing means (12) comprises steam nozzles (64), said steam nozzles (64) located above and adjacent to said oil accumulator (10), said steam nozzles (64) ejecting superheated steam towards said cells (20) whereby oil entrained upon said cells (20) may be removed and said cells (20) become oil-free.

8. A device for separating oil from water, comprising:

an oil accumulator (10), said oil accumulator (10) having a plurality of open substantially tubular cells (20) the plurality of which define a large surface area for its configuration, each of said cells having an oleophilic surface to which oil clings and water does not, a hollow cylinder (18), said hollow cylinder (18) having radial trusses (40) attached to transverse supports (42), said radial trusses (40) and said transverse supports (42) defining cages (38), and a plurality of removable blocks (16), said removable blocks (16) comprising said plurality of open cells (20), said removable blocks (16) removably fitting within said cages (38), said oil accumulator (10) being adapted for contact with oil and water in order to entrain and separate said oil from said water;

an oil remover (12), said oil remover (12) being operatively associated with said oil accumulator (10) and comprising steam nozzles (64), said steam nozzles (64) located above and adjacent to said oil accumulator (10), said steam nozzles (64) ejecting superheated steam towards said cells (20) whereby oil entrained upon said cells (20) may be removed and said cells (20) become oil-free; and an oil collector (14), said oil collector (14) cooperatively associated with said oil accumulator (10), said oil collector (14) centrally located within said hollow cylinder (18), said oil collector (14) having baffles (66) and a central perforated pipe (68), said baffles (66) preventing oil spillage from said oil collector (14) and said central perforated pipe (68) conducting oil more efficiently away from said oil accumulator (10), whereby said oil collector (14) collects oil removed by said oil remover (12) and transports it away from said oil accumulator (10).

9. The device for separating oil from water as set forth in claim 8, wherein said cells (20) comprise cylindrical tubes (22).

10. The device for separating oil from water as set forth in claim 8, wherein said cells (20) comprise a honeycomb structure (28).

11. The device for separating oil as set forth in claim 8, wherein said oil accumulator (10), said oil remover (12) and said oil collector (14) are located between the hulls of a catamaran vessel.

12. A device for recovering oil spilled on a body of water, comprising:

a rotating cylinder (18), said rotating cylinder rotating about its long axis;

a plurality of spaced, side by side tubes (28), said spaced, side by side tubes (28) being distributed along the exterior of said rotating cylinder (18) in a radial manner so that access is provided to the interior of said tubes (28) from the exterior of said cylinder (18), said tubes being adapted to entrain oil;

drive means for rotating said cylinder (18) through said body of water, said drive means coupled to said cylinder (18);

oil expulsion means (12) for expelling oil entrained in said tubes (28), said oil expulsion means (12) being operatively associated with said cylinder (18) and said tubes (28); and expelled oil collection means (14) for collecting oil expelled by said oil expulsion means (12), said collection means (14) located within said cylinder (18); whereby oil floating upon said body of water may be gathered and removed from said water by rotating said cylinder (18) in said oil and said water, said tubes (28) entraining said oil therein while resisting water entrapment when a portion of said cylinder (18) is rotated in said body of water, said collected oil brought by rotation of said cylinder (18) to an upper portion of said cylinder (18) where said oil expulsion means (12) causes entrained oil to travel from said tubes (28) to said collection means (14).

13. The device for recovering oil spilled on a body of water as set forth in claim 12, wherein said rotating cylinder (18) further comprises:
radial trusses (40) attached to transverse supports (42), said radial trusses (40) and said transverse supports (42) defining cages (38) in which said tubes (28) are fixed.

14. The device for recovering oil spilled on a body of water as set forth in claim 12, wherein said plurality of spaced, side by side tubes have oleophilic surfaces.

15. The device for recovering oil spilled on a body of water as set forth in claim 12, wherein said drive means further comprises a ring gear (48) encircling one end of said rotating cylinder (18), said ring gear (48) engaging a driving gear (50) controllably driven by a motor.

16. The device for recovering oil spilled on a body of water as set forth in claim 12, wherein said oil expulsion means (12) further comprises:
steam nozzles (64), said steam nozzles (64) located above and adjacent to said rotating cylinder (18), said steam nozzles (64) forcefully ejecting superheated steam towards said tubes (28) whereby oil entrained upon said tubes (28) may be removed and said tubes (28) become oil-free.

17. The device for recovering oil spilled on a body of water as set forth in claim 12, wherein said expelled oil collection means (14) comprises:
a trough having baffles (66) and a perforated central collecting pipe (68), said trough located generally central to said rotating cylinder (18) and collecting said oil expelled from said tubes (28).

18. A device for recovering oil spilled on a body of water, comprising:
a rotating cylinder (18), said rotating cylinder rotating about its long axis, said rotating cylinder (18) having radial trusses (40) attached to transverse supports (42), said radial trusses (40) and said transverse supports (42) defining cages (38);
a plurality of spaced, side by side tubes (28) having oleophilic surfaces, said spaced, side by side tubes (28) being distributed along the exterior of said rotating cylinder (18) in a radial manner in said cages (38) so that access is provided to the interior of said tubes (28) from the exterior of said cylinder (18), said tubes being adapted to entrain oil;
drive means for rotating said cylinder (18) through said body of water, said drive means coupled to said cylinder (18) and having a ring gear (48) encircling one end of said rotating cylinder (18), said ring gear (48) engaging a driving gear (50) controllably driven by a motor;
oil expulsion means (12) for expelling oil entrained in said tubes (28), said oil expulsion means (12) being operatively associated with said cylinder (18) and said tubes (28), said oil expulsion means comprising steam nozzles (64), said steam nozzles (64) located above and adjacent to said cylinder (18), said steam nozzles (64) forcefully ejecting superheated steam towards said tubes (28) whereby oil entrained upon said tubes (28) may be removed and said tubes (28) become oil-free; and
expelled oil collection means (14) for collecting oil expelled by said oil expulsion means (12), said collection means (14) located within said cylinder (18) and comprising a trough having baffles (66) and a perforated central collecting pipe (68), said trough located generally central to said rotating cylinder (18) and collecting said oil expelled from said tubes (28); whereby
oil floating upon said body of water may be gathered and removed from said water by rotating said cylinder (18) in said oil and said water, said tubes (28) entraining said oil therein while resisting water entrapment when a portion of said cylinder (18) is rotated in said body of water, said collected oil brought by rotation of said cylinder (18) to an upper portion of said cylinder (18) where said oil expulsion means (12) causes entrained oil to travel from said tubes (28) to said collection means (14).

19. The device for recovering oil spilled on a body of water as set forth in claim 18, wherein said rotating cylinder (18), said spaced, side by side tubes (28), said drive means, said oil expulsion means (12), and said expelled oil collection means (14) are fixed between the hulls of a catamaran boat.

* * * * *